United States Patent [19]
Byles

[11] Patent Number: 5,882,141
[45] Date of Patent: Mar. 16, 1999

[54] LOW ENERGY PRECISION FLOODING IRRIGATION APPARATUS AND METHOD

[75] Inventor: Joe D. Byles, Fresno, Calif.

[73] Assignee: Nibco, Inc., Elkhart, Ind.

[21] Appl. No.: 692,019

[22] Filed: Aug. 2, 1996

Related U.S. Application Data

[60] Provisional application Nos. 60/001,919 Aug. 4, 1995 and 60/005,280 Oct. 10, 1995.

[51] Int. Cl.$^6$ .................................................. A01G 25/02
[52] U.S. Cl. ............................................. 405/41; 239/562
[58] Field of Search ................................. 405/36, 37, 39, 405/40, 41, 42, 43, 44, 45, 51, 48; 239/201, 562

[56] References Cited

U.S. PATENT DOCUMENTS

| 2,563,300 | 8/1951 | Aker | 405/39 |
|---|---|---|---|
| 3,159,172 | 12/1964 | Baxter | 405/41 |
| 3,512,363 | 5/1970 | Wifear | 405/39 X |
| 3,518,831 | 7/1970 | Tibbals, Jr. et al. | 405/39 |
| 3,572,630 | 3/1971 | Mendenhall | 405/41 |
| 3,779,276 | 12/1973 | KIng, Sr. | 405/39 |
| 3,814,377 | 6/1974 | Todd | 405/39 X |
| 3,917,166 | 11/1975 | Hildebrandt | 405/51 X |
| 3,966,233 | 6/1976 | Diggs | 405/48 |
| 4,086,744 | 5/1978 | Duggins | 405/39 |
| 4,153,580 | 5/1979 | Hartman | 405/39 |
| 4,923,330 | 5/1990 | De Tommaso | 405/48 |
| 4,930,934 | 6/1990 | Adkins | 405/37 |
| 5,024,555 | 6/1991 | York | 405/48 |
| 5,054,690 | 10/1991 | Olsen | 405/39 X |
| 5,102,259 | 4/1992 | York et al. | 405/48 |
| 5,201,605 | 4/1993 | Lang et al. | 405/37 |

Primary Examiner—Tamara L. Graysay
Assistant Examiner—Frederick Lagman
Attorney, Agent, or Firm—Shaffer & Culbertson, LLP; Russell D. Culbertson

[57] ABSTRACT

An irrigation conduit (10) includes a plurality of emitters (11) spaced apart along its length. A conveyance channel (12) is connected to each emitter (11) and is long enough so that a distal end (14) of the conveyance channel (12) may be positioned at or just above the soil surface with the conduit (10) buried below the soil surface. Each emitter (11) or each conveyance channel (12) includes associated with it a flow control arrangement (30) to control the rate of flow through the conveyance channel (12) when water is applied to the conduit (10) at a desired pressure and flow rate. The flow rate through each conveyance channel (12) exceeds the local hydraulic loading rate of the soil adjacent to the conveyance channel (12). The rate in excess of the local hydraulic loading rate causes localized flooding and allows the water to spread out substantially across the soil surface prior to moving downwardly into the soil.

25 Claims, 5 Drawing Sheets

LOW ENERGY PRECISION FLOODING IRRIGATION APPARATUS AND METHOD

BACKGROUND OF THE INVENTION

This application claims priority of prior U.S. Provisional Patent Application No. 60/001,919, filed Aug. 4, 1995, and U.S. Provisional Patent Application No. 60/005,280 filed Oct. 10, 1995, which are both incorporated herein by reference.

This invention relates to irrigation methods, and more particularly to a method for providing surface point drip irrigation with enhanced efficiency. The invention also includes an apparatus for providing efficient surface point drip irrigation.

Abroad and in the United States a large percentage of potable, fresh water consumption is utilized for irrigating landscape and ornamental plantings. Prior state of the art irrigation systems utilized for delivering water to landscape plantings were inefficient and contributed greatly to the exhaustion of water reserves in many areas. Spray head systems, which are most commonly used for landscape purposes, lose water to evaporation, runoff, and overspray. The tiny spray droplets necessary to achieve uniform water distribution are vulnerable to wind and are more often than not blown out of the area intended to be irrigated, contributing to the overspray problems. Runoff occurs because the spray heads tend to deliver water too quickly to the periphery of the area to be irrigated and the excess water drains off to adjacent areas. In addition, water droplets from spray head systems tend to impinge on surrounding structures, such as houses, fences, and vehicles, causing discoloration, staining, and other damage.

Low volume surface drip irrigation devices and lines, typically emitting in the range of one-half gallon per hour (gph) to 2 gph, use an extensive network of conduits and emitters which are spaced apart on the surface of the area to be irrigated. Surface drip irrigation also uses manifolds which distribute water to small tubes extending to specific plants. In this surface drip system, water is emitted at rates slow enough to gently soak into the soil directly below the emitter and spread laterally only short distances by capillary action in the soil. Delivery of water in this manner does eliminate runoff, overspray, and evaporation problems, but is only practical for landscape settings in areas not subject to traffic. Even in landscape situations, conventional low flow rate surface drip irrigation systems are not effective for dense plantings unless the emitters are spaced very close to each other, at a distance less than 12 to 18 inches apart. If used in traffic areas such as lawns, low flow surface drip irrigation systems are impractical since the lines must be picked up in between irrigations so as not to be damaged.

Subsurface drip irrigation systems consist of low volume drip emitter lines having one-half gph to two gph emitters placed beneath the soil surface. These subsurface drip irrigation systems provide water directly to the plant root zone without any surface lines. However, the spacing of these conventional subsurface drip lines must be very close, 12 to 18 inches, to provide uniform watering in between the lines. This close spacing requirement makes conventional subsurface drip lines too costly and not practical for a majority of irrigation situations. Even with close spacing of the lines, a majority of the water is lost below the root zones of the plants due to limited capillary action and the effects of gravity. In addition, plant roots have been known to grow into the subsurface emitters, completely blocking flow or at least interfering with the proper flow of water from the emitters. State of the art solutions to this root intrusion problem have consisted of using toxic chemicals impregnated within the lines or run through the irrigation water to kill the roots around the emitters.

The subsurface irrigation system shown in U.S. Pat. No. 5,374,138 represents a significant improvement over conventional subsurface drip irrigation systems. The water deflector positioned beneath the subsurface emitters causes the emitted water to spread laterally to provide uniform watering with wider spacing between emitters. Thus, although it requires the additional deflector component, the subsurface irrigation system shown in U.S. Pat. No. 5,374,138 eliminates some of the problems with conventional subsurface drip irrigation systems.

SUMMARY OF THE INVENTION

It is a general object of the invention to overcome the above-described problems and others associated with irrigation devices and methods. More particularly, it is an object of the invention to provide improved devices and methods for low volume drip line irrigation for turf, landscape, and other applications.

In order to accomplish this object, the apparatus according to the invention includes at least one irrigation conduit with spaced apart emitters which emit water at flow rates ranging from conventional low volume drip irrigation rates up to the flow rate of a conventional full circle spray head, namely 2 gph through 4 gallons per minute (gpm). Each irrigation conduit is buried beneath the surface in the area to be irrigated with an individual flexible or partially flexible conveyance channel transferring the subsurface emitted water to a point directly above the soil surface. The flow rate of each emitter is high enough to cause localized saturation and runoff of water directly around the surface emission point. This localized saturation and runoff causes the water to spread laterally creating a large circular wetted area around the surface emission point. The water in the wetted area moves from the soil surface to the lower levels of the root zone. The spacing of the emitters and conveyance channels along the irrigation conduit and flow rate of the individual emitters is based upon the soil characteristics, with the rates being typically 0 to 60 gallons per hour, the higher rates for coarser soils and the lower rates for finer soils. Each individual emitter within the drip line can be associated with a flow controlling device, such as a valve, which will allow for the manual adjustment of each individual emitter flow rate within the conveyance channel from no flow to the maximum flow of the emitter. The flow control can be in the emitter or located somewhere along the conveyance channel associated with the emitter. The individual control allows for fine tuning adjustment of the system in response to localized changes in the soil condition or micro-climate needs.

The apparatus and method of the invention are applicable where there is a layer of material at the soil surface forming a discontinuity with the soil, and being substantially coextensive with the soil surface. By "substantially coextensive" it is meant that the layer of material need not cover the entire soil surface by may include small gaps. For example, as much as 50% of the area to be irrigated may comprise gaps in the discontinuity layer if the gaps are evenly dispersed throughout the area. In any event, the discontinuity layer may comprise a layer of thatch, mulch, the mat associated with dense plantings, or even a type of soil different from the soil comprising the soil surface. As used herein, the "mat" comprises the combination of live plant matter (blades where the plant is a turf grass), thatch, and upper soil layer containing the dense root zone associated with the plants. Water emitted to the discontinuity layer tends to first saturate the discontinuity layer and spread out laterally a substantially distance prior to moving into sublayers.

The goal of the individual emitter and conveyance channel arrangement is to release water at or just above the soil surface at a rate high enough to overcome the local soil and discontinuity layer hydraulic loading rate so as to cause the water to move outwardly from the distal end of the conveyance channel to the immediate surrounding area without excessive deep percolation and waste of water. The flow rate, however, is not high enough to create excessive flooding and runoff in an uncontrolled manner. Experimentation has shown that eight (8) foot spacing of thirty (30) gph emitters along irrigation conduits, placed in parallel rows eight (8) feet apart with 0.25 inch conveyance channels work well to irrigate St. Augustine lawn turf in a fine soil. The discontinuity layer in this case comprised the layer of thatch associated with the turf at the soil surface, the grass blades, and the dense root zone of the turf grass just below the soil surface.

The irrigation drip line according to the invention is preferably made of a low density, polyethylene tubing with emission control devices spaced along the length of the line at predetermined intervals. The emission control devices, also known as emitters, can either be of a pressure compensating or non-pressure compensating form. Individual flow control for each emitter within the drip line may comprise a valve or other flow control arrangement either built into the emitters themselves or formed separately as discrete components positioned anywhere along the conveyance channel. The flow control can be adjusted at the time of installation or adjusted at any time following installation in response to specific needs.

In one form, the invention includes integrally molded emitters which are inserted into the polyethylene line during the manufacture process when the polyethylene material is in a flowable stage. Regardless of the manufacturing process, each emitter preferably has a protruding fitting which extends out of the polyethylene pipe. The conveyance channel of the desired length, preferably approximately six (6) inches, is then attached to the protruding fitting. The preferred fitting has a barb which helps the conveyance channel remain attached during shipping and installation.

An alternate form of the invention comprises a length of polyethylene pipe with no emitters inserted during manufacture. In this alternate form of the invention, emitters with barbed fittings are attached to the polyethylene pipe in a secondary process. The emitters are punched into the polyethylene pipe at predetermined spacings so as to create a matrix of emission points when installed parallel to other drip lines. The punch-in emitters have an additional barbed fitting for punching into the conveyance channel material. The conveyance channel can be made of any flexible or partially flexible material, but low density polyethylene or vinyl are the preferred materials.

Regardless of how the emitters are installed on the conduit, the irrigation conduit, consisting of the polyethylene pipe, is buried below grade, that is, below soil surface level in a trench, with the conveyance channel extending upward so that the distal end is located at or just above grade. The trench is then backfilled so as to create an invisible installation. The lines will typically be laid out in a multiple parallel fashion so as to create a continuous matrix of emission points which allows a large, continuous area to be irrigated from the buried line. The parallel lines or conduits are preferably connected to supply header lines, which provide pressurized water from a line source. The conduits are grouped into zones and typically controlled by an irrigation zone valve which controls the supply of pressurized water to the irrigation conduits. The individual flow controls discussed previously for each emitter can be installed at the distal end of the conveyance channel, within the conveyance channel, within the individual emitters or left out if needed, or selectively installed in the conveyance channels of only the emitters where it is deemed to be needed.

The invention also includes additional devices at the end of the conveyance channel such as finely screened caps to prevent bugs from crawling into the lines, and also to prevent dirt from entering the lines during installation or thereafter. Furthermore, a diffusion device may be connected at the end of the conveyance channel to diffuse the emitted water around the conveyance channel distal end and prevent the stream of emitted water from traveling through the air substantially before hitting the ground or discontinuity layer.

The operation of the above-described apparatus and the irrigation method of the invention provides continuous and, efficient water distribution for dense plantings having a substantially continuous dense root zone at or near the soil surface. In each application, the system provides a positive, mechanical means, comprising the conveyance channel and its mechanical connection to the emitters, for preventing roots from growing into the subsurface emitter location. Although perfectly suited for turf grass irrigation, the apparatus and method of the invention is applicable for any area with a discontinuity layer of material at the soil surface, whether the discontinuity layer is natural such as a dense root zone, or artificial such as an added mulch or a thin layer of a different soil type.

The apparatus provides a system which is not affected by either wind, overspray, or runoff. The addition of individual flow controls in the emitter or conveyance channel provides precise control of the wetting efficiency, width, and pattern for precise control of the water application in response to micro-climates and soil changes.

These and other objects, advantages, and features of the invention will be apparent from the following description of the preferred embodiments, considered along with the accompanying drawings.

DESCRIPTION OF THE PREFERRED EMBODIMENTS

Figure 1:
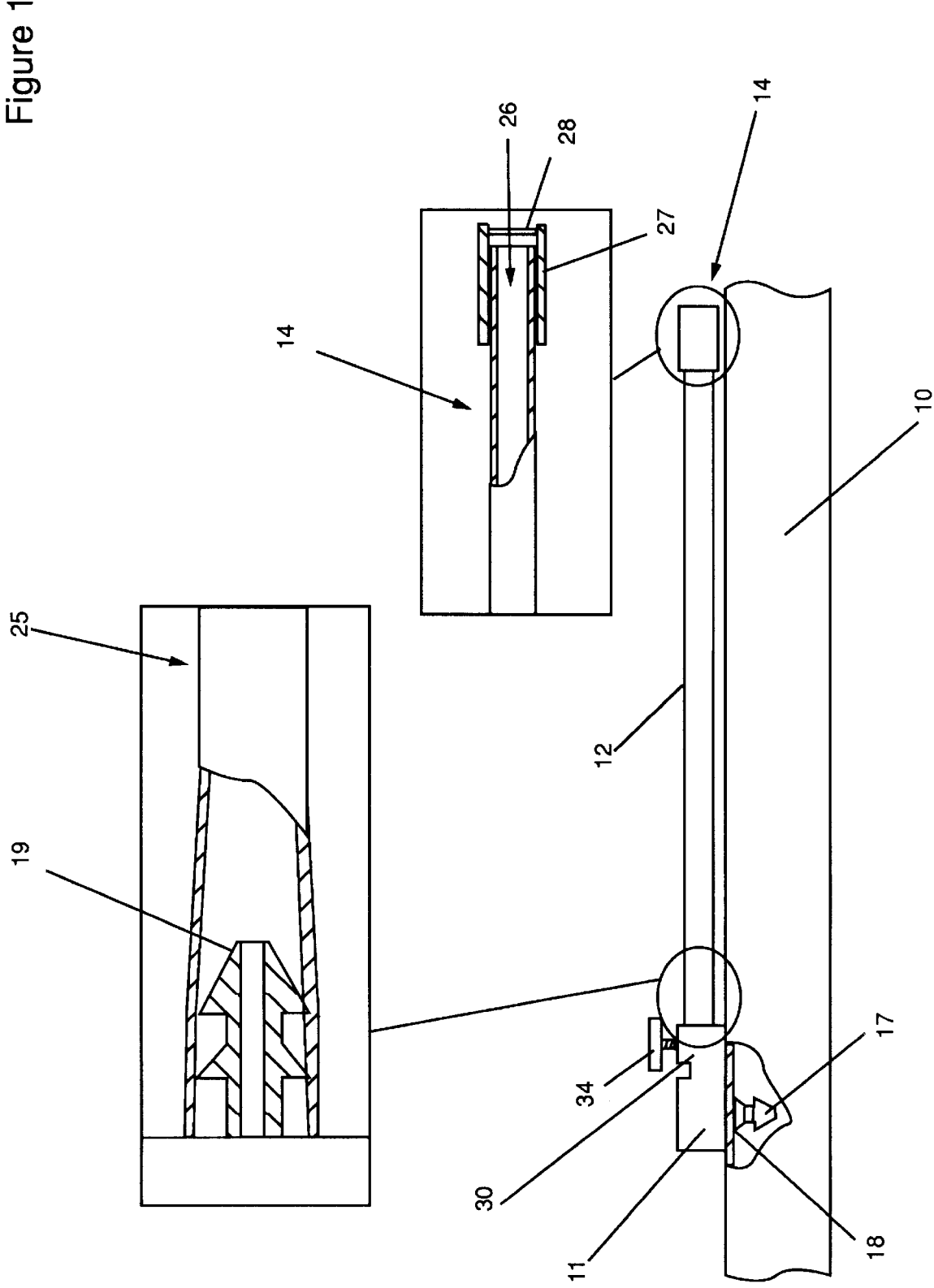
FIG. 1 is a somewhat diagrammatic view in side elevation of an irrigation apparatus embodying the principles of the invention partially cut away at the emitter and conveyance channel connectors, and the conveyance channel screen cap.

FIG. 1 illustrates a portion of one preferred form of irrigation line embodying the principles of the invention.

The apparatus includes a conduit 10, an emitter 11 connected to receive water from the conduit, and a conveyance channel 12 connected to the emitter. The emitter 11 in the illustrated form of the invention includes a flow control arrangement 30 integrally formed therewith. The apparatus shown in FIG. 1 is in the position for storage with the conveyance channel 12 extending substantially parallel to the conduit 10.

The emitter 11 includes a barbed connector 17 which extends into an opening 18 punched or otherwise formed in the conduit 10. Barbs on the connector 17 cooperate with the edge of the opening 18 through the conduit 10 to secure the emitter 11 to the conduit. The emitter 11 also includes a second barbed connector 19 similar to the connector 17 extending into the opening 18 through the conduit 10. The second barbed connector 19 is adapted for connecting the conveyance channel 12 to the emitter 11. The barbs on the second connector 19 cooperate with the inner surface of the conveyance channel material to hold the conveyance channel 12 in place with the proximal end 25 of the conveyance channel connected to receive water from the emitter 11. Although the barbed connectors 17 and 19 are preferred for making the connections between the conduit 10, emitter 11, and conveyance channel 12, any type of connector may be used to make the desired connections. Also, other forms of the invention may include emitters integrally formed with the conduit or the conduit may include an integrally formed connector for connecting directly to the conveyance channel or a flow control device. The flow control device 30 shown integrally formed with the emitter 11 in FIG. 1, may comprise a suitable valve structure with a valve control 34 for varying the flow rate through the device. Alternatively, the flow control device may simply be a fixed orifice or other suitable arrangement for fixing the flow rate through the conveyance channel 12. Also, although the flow control device 30 is shown integrally formed with the emitter 11, flow control may be accomplished by a device separate from the device making the connection between the conveyance channel 12 and conduit 10. For example, the flow control device may be a separate device connected at any point along the conveyance channel from the proximal end 25 to the distal end 14. Those skilled in the art will appreciate that positioning the variable flow rate flow control device near the distal end 14 of the conveyance channel 12 as shown at reference numeral 31 in FIG. 2 has the advantage of allowing the flow rate to be adjusted without digging up the system.

The conveyance channel 12 comprises a length of preferably flexible tubing. The distal end 14 of the conveyance channel 12 includes an outlet opening 26 preferably covered with a cap 27 having a screen 28. The screen 28 prevents insects from entering and obstructing the conveyance channel 12. Although the screen 28 is preferably formed with the cap 27, screen material may be placed over the outlet opening 26 in any manner. Also, although not shown in FIG. 1, a closed-ended cap or plug may be used to cover the outlet opening 26 during storage, transport, or during the installation process to prevent material from entering the outlet opening and interfering with the operation of the system. The closed-ended cap or plug may be removed once the device is installed.

In one preferred form of the invention, the conduit 10 comprises a one-half inch diameter polyethylene pipe. The conveyance channel in this preferred form comprises one-quarter inch diameter vinyl tubing. These materials operate well with the barbed connectors 17 and 19 discussed above in connection with the emitter 11. The flow control device 30 associated with each conveyance channel 12 may control the flow through the respective conveyance channel to any rate between 0 and 60 gph. When a variable rate flow control device is used, the rate may preferably be varied within the 0 to 60 gph range.

Figure 2:
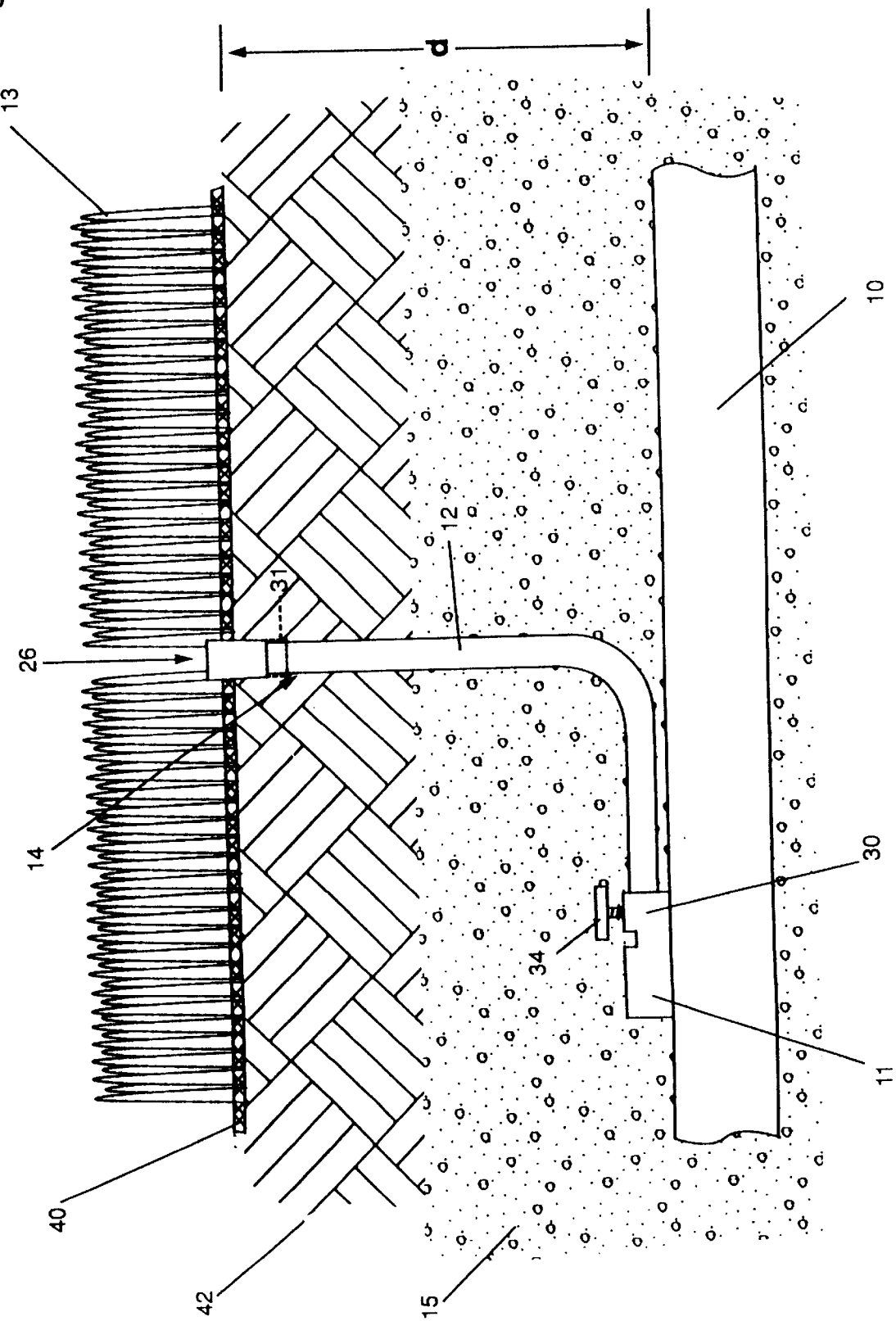
FIG. 2 is a partial section view showing the irrigation apparatus of FIG. 1 as installed.

Referring now to FIG. 2, the conduit 10 is buried in soil 15 along with the emitter 11 at a depth d below the soil surface, preferably below the root zone for the turf grass or around six inches below the soil surface. The conveyance channel 12 extends from the conduit 10 with the distal end 14 and outlet opening 26 positioned just above the soil surface. Although not shown in FIG. 2, a diffuser may be connected to the conveyance channel 12 over the outlet opening 26 to direct the water laterally rather than upwardly into the air. The installation shown in FIG. 2 is in an area of turf grass 13 which commonly includes a layer of thatch 40 built up just above or at the soil surface. Immediately below the soil surface, a dense root zone 42 extends one to two inches below the soil surface. For many types of turf grass, deep roots extend below the dense root zone 42 into the soil 15. As used herein, the term "soil surface" encompasses the surface of soil below the discontinuity layer.

Figure 3:
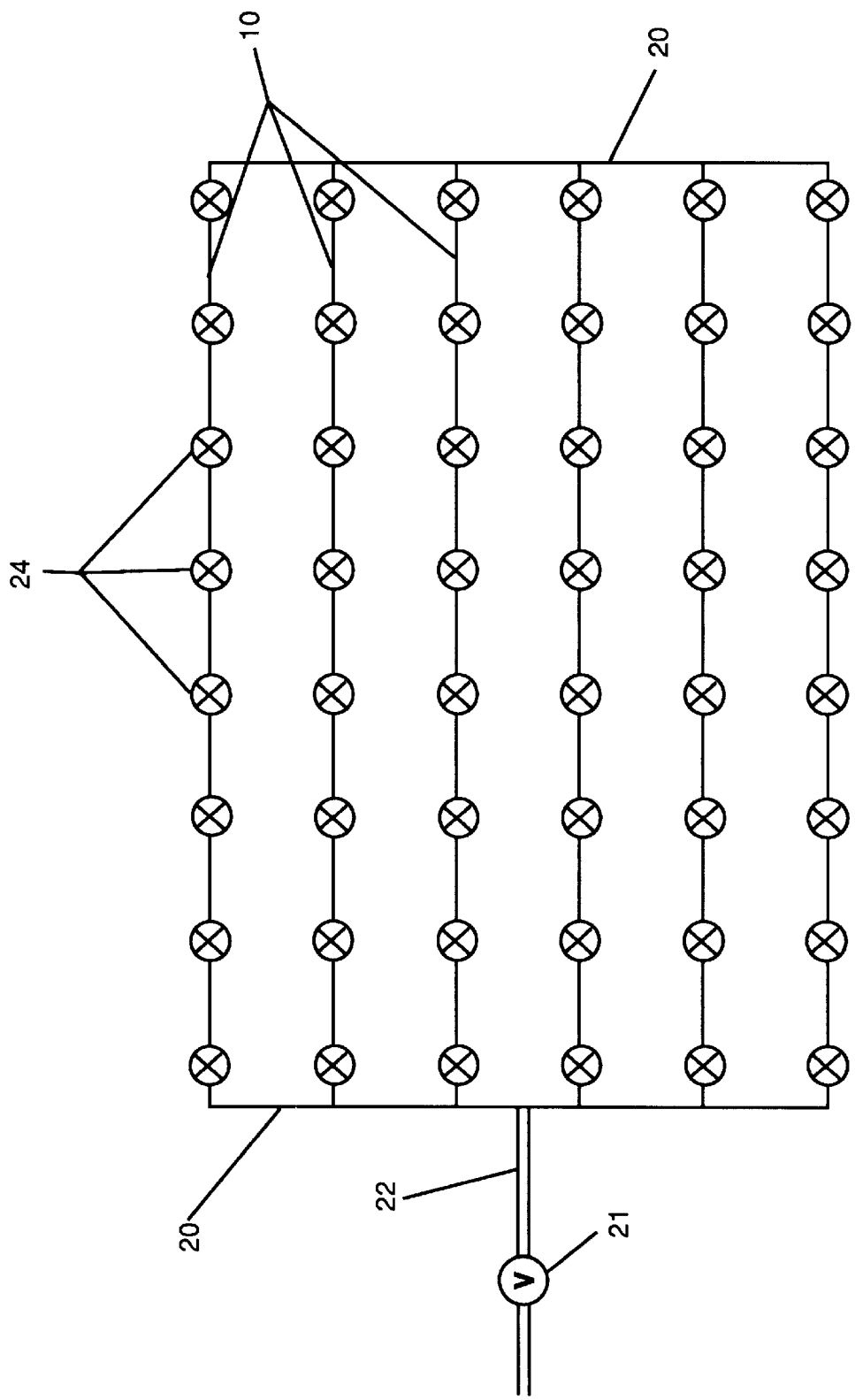
FIG. 3 is a schematic drawing showing the irrigation apparatus layout to irrigate a large, continuous area.

Referring to FIG. 3, a plurality of conduits 10 may be arranged to irrigate a large area A. The conduits 10 are preferably arranged parallel to each other and connected at one or both ends by a header conduit 20. A supply line 22 supplies water to the header conduit 20 at a desired input pressure and flow rate to produce the desired flow rate through the conveyance channels associated with each conduit 10 as will be discussed below. The flow to the conduits 10 is controlled by a master supply valve 21 positioned in the supply line 22. This supply valve 21 is closed to stop the irrigation process or opened to allow water to be emitted through the conveyance channels associated with each conduit 10. Each conduit 10 shown in FIG. 3 includes a plurality of flow control emitters and conveyance channels as shown in FIGS. 1 and 2, and as shown in FIG. 2, each conveyance channel 12 extends to the soil surface to emit water just above the soil surface and thatch layer 40. Each emitter, flow control, and conveyance channel combination is represented in FIG. 3 as an emission point or location 24. The emission points 24 are spaced apart along each conduit 10 and the conduits themselves are spaced apart so that the wetting pattern associated with each emission point combines with the other emission point wetting patterns to cover the entire area A to be irrigated as will be discussed with reference to FIGS. 4 and 5. Although the emission points are shown lined up in FIG. 3, the emission points may be staggered or arranged in any other fashion to provide the desired irrigation coverage.

Figure 4:
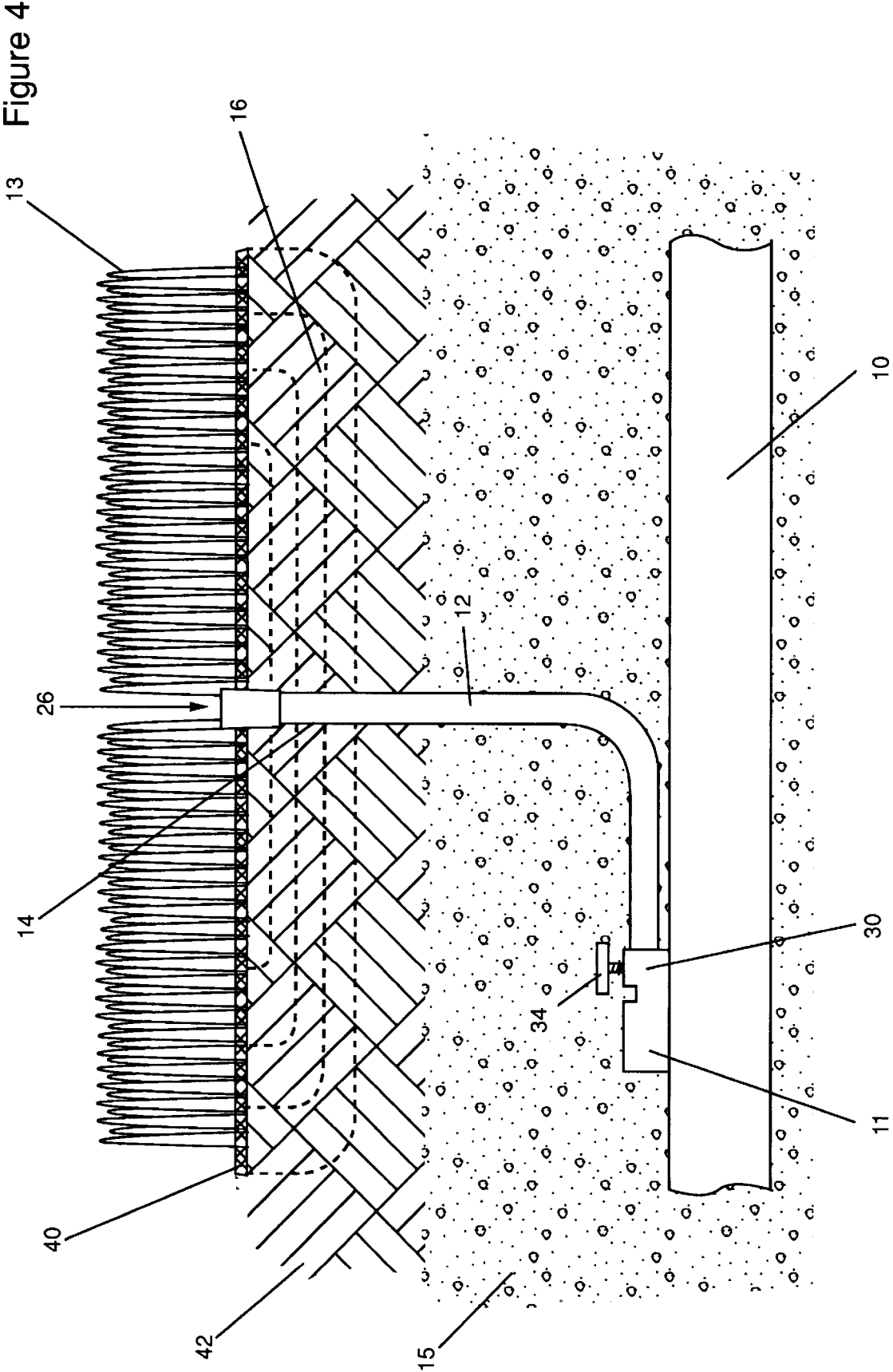
FIG. 4 is a partial section view similar to FIG. 2 showing the resulting soil wetting profile produced according to the invention.
Figure 5:
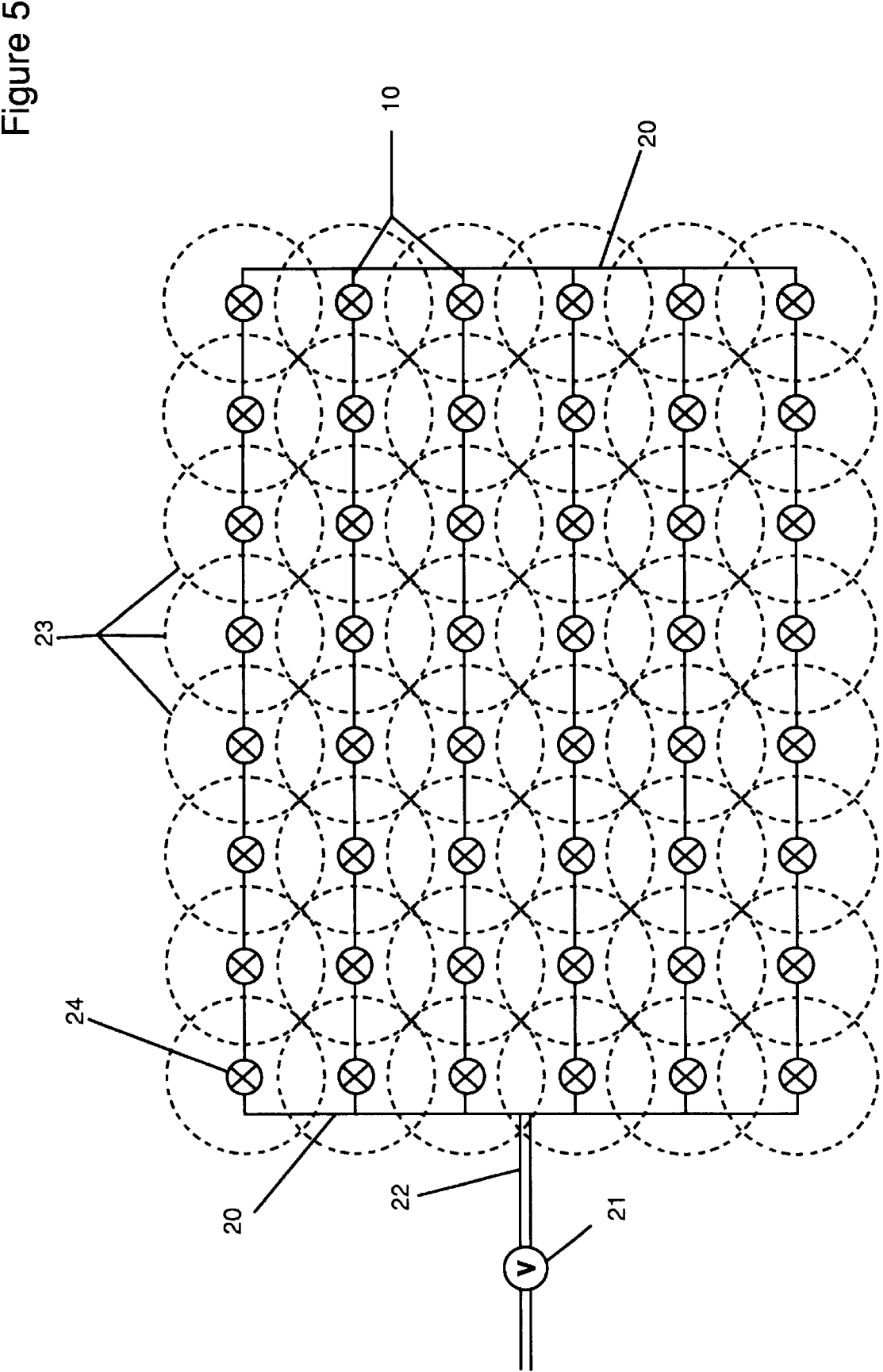
FIG. 5 is a top plan view of the system installed showing the individual emission point wetting patterns combining to provide continuous wetting of the area to be irrigated.

The operation of the irrigation apparatus and the irrigating method of the invention may be discussed with particular reference to FIGS. 4 and 5. Referring to FIG. 4, supplying water to the conduits 10 at the desired input pressure and flow rate causes the irrigation water to flow out of the outlet opening 26 of each conveyance channel 12 at a desired flow rate. The flow of water out of each conveyance channel outlet opening 26 is at a rate exceeding the local hydraulic loading rate of the soil in the area around the outlet opening. Since the flow rate is above the local hydraulic loading rate, not all of the water travels downwardly immediately through the thatch 40 and dense root zone 42 into the soil 15, but rather, part of the water spreads out over the surface and through the thatch 40 and dense root zone 42, producing wetting pattern or profile 16. The water continues to spread by this localized flooding until the water is spread out enough so that the flow rate at the particular location does not exceed the hydraulic loading rate, thus allowing the water to enter the soil and spread a short distance further by capillary action.

On a substantially level area with a common soil type and continuous turf grass such as that shown in FIG. 5, the wetting pattern 23 around each emission point 24 is generally circular. Depending upon the hydraulic loading rate of the soil, and the rate of flow through each conveyance channel, the circular pattern may have a radius between 2 feet and 12 feet. For example, in one installation, the conduits 10 were spaced eight (8) feet apart in parallel fashion as shown in FIG. 5 in a St. Augustine lawn turf area and a fine soil. The emitter flow control valve, and conveyance channel combinations were spaced eight (8) feet apart along each conduit. When water was applied to produce a thirty (30) gallon per hour flow rate through each conveyance channel, the wetting patterns around each conveyance channel outlet opening combined to produce continuous coverage through the lawn area after 45 minutes. Thus, the wetting patterns after 45 minutes were approximately 11.3 feet in diameter centered over each emission point. In the same tests, time periods from 45 to 60 minutes were employed and each found to provide the desired irrigation. Lower or higher emission times may be used or required depending upon the local soil and discontinuity layer conditions.

In tests of the apparatus in lawn turf areas, it was noted that the thatch layer and the mat or dense root zone associated the turf grass as shown at reference numerals 40 and 42, respectively, in FIGS. 2 and 4 produce a lower hydraulic loading rate than bare soil. The thatch and dense root zone or mat each represent a discontinuity layer with respect to the soil that effectively reduces the hydraulic loading rate at any particular point across the lawn area. This lower hydraulic loading rate serves to increase the diameter of the wetting pattern over that which is possible with a bare soil at the same emission rates from the conveyance channels. Also, when water is applied above the discontinuity surface at the proper flow rate according to the invention, the water tends to saturate the discontinuity layer first. After the discontinuity layer or layers, such as thatch 40 and mat 42 are saturated, the water then soaks down into the lower soil area such as soil 15 in FIGS. 2 and 4.

The above described preferred embodiments are intended to illustrate the principles of the invention, but not to limit the scope of the invention. Various other embodiments and modifications to these preferred embodiments may be made by those skilled in the art without departing from the scope of the following claims.

I claim:

1. An irrigation apparatus for irrigating an area of soil having a discontinuity layer positioned at the soil surface and being substantially coextensive with the soil surface, the apparatus comprising:
   (a) at least one primary conduit traversing an area of soil to be irrigated, each primary conduit being buried beneath the soil surface and having a water supply opening for connecting to a water supply which supplies irrigation water to the primary conduit at an input pressure and an input flow rate;
   (b) a plurality of conveyance channels, each conveyance channel connected at a proximal end to the primary conduit so as to receive irrigation water therefrom, and extending from the primary conduit through the discontinuity layer so that a distal end of the respective conveyance channel is positioned above the discontinuity layer in the area to be irrigated, each conveyance channel also having an outlet associated with the distal end thereof through which irrigation water may be emitted onto the discontinuity layer at a single continuous emission location, each conveyance channel outlet emitting water at an emission rate exceeding a local hydraulic loading rate associated with the combination of the discontinuity layer and the soil and producing localized run-off when irrigation water is applied to each primary conduit at the input pressure and input flow rate, the emission of water and localized run-off producing an extended wetting pattern around each emission location; and
   (c) the distal end of each conveyance channel being spaced apart from the distal end of each adjacent conveyance channel so that the extended wetting patterns associated with the plurality of conveyance channels combine to cover substantially the entire area to be irrigated.

2. The irrigation apparatus of claim 1 further comprising:
   (a) flow control means associated with each conveyance channel, each flow control means for controlling the flow rate of irrigation water through the respective conveyance channel with which it is associated so as to produce the desired wetting pattern around the distal end of said respective conveyance channel.

3. The apparatus of claim 2 wherein each flow control means includes:
   (a) an adjustment mechanism by which the flow rate through the respective conveyance channel may be adjusted within a desired range of flow rates.

4. The apparatus of claim 2 wherein flow control means is positioned at the proximal end of the respective conveyance channel.

5. The apparatus of claim 4 wherein the flow control means comprises:
   (a) a flow control device formed separately from the primary conduit and having a barbed input extension for extending through an opening in the primary conduit, and a conveyance channel connector for accepting the proximal end of one of the conveyance channels.

6. The apparatus of claim 2 wherein the flow control means is positioned at the distal end of the respective conveyance channel.

7. The apparatus of claim 2 wherein the flow control means for each conveyance channel comprises a pressure compensating flow control device.

8. The apparatus of claim 2 wherein the flow control means for each conveyance channel comprises a non-pressure compensating flow control device.

9. The apparatus of claim 2 wherein the flow control means associated with each conveyance channel controls the flow rate through the respective conveyance channel to less than sixty gallons per hour.

10. The apparatus of claim 2 wherein:
    (a) the flow control means associated with each conveyance channel controls the flow rate through the respective conveyance channel to approximately thirty gallons per hour; and
    (b) the conveyance channel outlets are spaced approximately eight feet between adjacent conveyance channel outlets.

11. The apparatus of claim 2 further comprising:
    (a) a plurality of primary conduits running substantially parallel to each other and spaced apart approximately eight feet;

(b) a header conduit extending substantially perpendicular to each of the primary conduits with the water supply opening for each primary conduit connected to receive irrigation water from the header conduit; and (c) wherein the header conduit is connected to receive irrigation water from the water supply.

12. The apparatus of claim 11 wherein the flow control means associated with each conveyance channel controls the flow rate through the respective conveyance channel to approximately thirty gallons per hour.

13. The apparatus of claim 2 wherein the flow control means associated with each conveyance channel controls the flow rate through the respective conveyance channel to a flow rate between two gallons per hour and four gallons per minute.

14. The apparatus of claim 1 wherein each primary conduit includes a plurality of integrally formed connectors, each connector accepting the proximal end of one of the conveyance channels.

15. The apparatus of claim 1 further comprising:

(a) a screen associated with the outlet of each conveyance channel for preventing debris from entering the distal end of the conveyance channel.

16. The apparatus of claim 1 further comprising:

(a) diffuser means associated with the outlet of each conveyance channel for directing the flow of irrigation water laterally about the distal end of the respective conveyance channel.

17. A method of irrigating an area of soil having a discontinuity layer substantially coextensive with the soil surface and at the soil surface, the method comprising the steps of:

(a) supplying irrigation water to an underground primary conduit at an input pressure and an input flow rate;

(b) directing irrigation water to the surface of an area to be irrigated through a plurality of conveyance channels, each conveyance channel connected at a proximal end to the primary conduit and traversing the discontinuity layer so that a distal end thereof is positioned above the discontinuity layer; and (c) emitting irrigation water through an outlet at the distal end of each conveyance channel to an emission location at an emission rate exceeding a local hydraulic loading rate associated with the combination of the discontinuity layer and the soil to be irrigated, the emission rate producing localized run-off and an extended wetting pattern around said outlet, the extended wetting patterns around the plurality of outlets combining to cover the entire area to be irrigated.

18. The method of claim 17 further comprising the step of:

(a) controlling the flow rate through each conveyance channel with a separate flow control device associated with each separate conveyance channel.

19. The method of claim 17 further comprising the step of diffusing the irrigation water at the emission location.

20. The method of claim 17 including the step of:

(a) screening the irrigation water at the outlet of each conveyance channel.

21. The method of claim 17 wherein irrigation water is emitted from each conveyance channel outlet at a rate of less than sixty gallons per hour.

22. The method of claim 17 wherein irrigation water is emitted through the outlet of each conveyance channel at a rate of approximately thirty gallons per hour.

23. The method of claim 17 wherein:

(a) irrigation water is emitted from each conveyance channel outlet at a rate of approximately thirty gallons per hour; and (b) each conveyance channel outlet is spaced approximately eight feet from each adjacent conveyance channel outlet.

24. The method of claim 17 wherein the step of supplying irrigation water to a primary conduit includes supplying water from a header conduit and further comprising the step of:

(a) supplying irrigation water to at least one other underground primary conduit, each other primary conduit having a plurality of conveyance channels connected thereto, each conveyance channel connected at a proximal end to the primary conduit and having a distal end with an outlet at substantially the level of the soil surface;

(b) directing irrigation water to the surface of the area to be irrigated through the plurality of conveyance channels connected to each said other primary conduit; and (c) emitting irrigation water through the outlet of each conveyance channel connected to each said other primary conduit at substantially the same flow rate as that through each of the conveyance channels associated with the primary conduit to produce the desired wetting pattern around said outlet, the wetting patterns around the plurality of conveyance channel outlets combining to cover the entire area to be irrigated.

25. An irrigation apparatus for irrigating an area of soil having a discontinuity layer substantially coextensive with the soil surface and at the soil surface, the apparatus comprising:

(a) a primary conduit traversing an area of soil to be irrigated, and being buried beneath the soil surface and having a water supply opening for connecting to a water supply which supplies irrigation water to the primary conduit at an input pressure and input flow rate;

(b) a conveyance channel connected at a proximal end to the primary conduit so as to receive irrigation water therefrom, the conveyance channel traversing the discontinuity layer so that a distal end thereof is positioned above the discontinuity layer in the area to be irrigated, the conveyance channel also having an outlet associated with the distal end thereof, through which irrigation water may be emitted onto the discontinuity layer at an emission location, the conveyance channel outlet emitting water at an emission rate exceeding approximately thirty gallons per hour to produce localized run off when irrigation water is applied to the primary conduit at the input pressure and input flow rate, the emission of water and localized run off producing an extended wetting pattern around the emission location; and (c) the distal end of the conveyance channel being positioned within the area to be irrigated so that the extended wetting pattern covers substantially the entire area to be irrigated.

* * * * *